United States Patent [19]

Fukuyama et al.

[11] 4,415,977
[45] Nov. 15, 1983

[54] METHOD OF CONSTANT PERIPHERAL SPEED CONTROL

[75] Inventors: Hiroomi Fukuyama, Hachioji; Shinichi Isobe, Tachikawa, both of Japan

[73] Assignee: Fujitsu Fanuc Limited, Tokyo, Japan

[21] Appl. No.: 243,928

[22] PCT Filed: Jun. 30, 1980

[86] PCT No.: PCT/JP80/00150
§ 371 Date: Mar. 2, 1981
§ 102(e) Date: Feb. 20, 1981

[87] PCT Pub. No.: WO81/00073
PCT Pub. Date: Jan. 22, 1981

[30] Foreign Application Priority Data

Jun. 30, 1979 [JP] Japan .................... 54-82779

[51] Int. Cl.³ .................... B23Q 15/10; G05B 19/18; G06F 15/46
[52] U.S. Cl. .................... 364/474; 318/571; 364/565
[58] Field of Search .................... 364/474, 475, 565; 83/22, 74-76; 82/DIG. 47; 318/571, 572, 603, 632

[56] References Cited

U.S. PATENT DOCUMENTS 3,595,106  7/1971  Pomella .................... 364/474 X
4,038,890  8/1977  Winget .................... 364/474 X
4,079,235  3/1978  Froyd et al. .................... 364/474 X
4,262,336  4/1981  Pritchard .................... 364/474
4,296,364  10/1981  Fukuyama et al. .................... 364/474 X
4,330,832  5/1982  Kohzai et al. .................... 364/474

FOREIGN PATENT DOCUMENTS

81/01896  7/1981  PCT Int'l Appl. .................... 364/474

Primary Examiner—Edward J. Wise

[57] ABSTRACT

A method for rotating a workpiece at a constant peripheral speed when the workpiece is cut as on a lathe. Before a cutting tool is moved to a cutting position under a rapid-advance command, the number n of RPM for the spindle is computed from the following equation, based on the distance x between the cutting position and the axis of the spindle and based on the commanded periphery speed V for driving the spindle at the computed number of RPM thereof:

$$n = V/2\,x$$

Accordingly, the actual peripheral speed of the spindle becomes the same as or approximates the commanded peripheral speed when the cutting tool reaches the cutting position.

6 Claims, 6 Drawing Figures

METHOD OF CONSTANT PERIPHERAL SPEED CONTROL

BACKGROUND OF THE INVENTION

The present invention relates to a method of controlling a workpiece to revolve at a constant peripheral speed when the workpiece is cut on a lathe, and more particularly to a method of controlling the peripheral speed of the workpiece by controlling the spindle of the lathe to rotate the workpiece at a predetermined peripheral speed before cutting begins, so that cutting can be initiated immediately after the cutting tool has been positioned.

It is general practice in machining operations to select an optimum cutting speed and to cut a workpiece at the selected speed in order to increase the service life of a cutting tool and to reduce the cutting time. The optimum cutting speed is determined by the materials of the workpiece and the cutting tool used, the depth of the cut and the like.

On lathes a revolving workpiece, which is generally cylindrical in shape, is secured by a chuck to a spindle. A cutting tool is caused to travel across the revolving workpiece in order to cut into the latter by a desired amount. The cutting tool is moved in a direction normal to the axis of the spindle (or along the X axis) until the workpiece is cut to a desired depth. Therefore, the cutting speed in such a cutting operation depends on the peripheral speed at which the workpiece revolves. The peripheral speed, V, of the workpiece can be expressed by the following equation:

$$V = 2\pi R n \quad (1)$$

where n is the number of RPM of the spindle (or RPM number) and R is the radius of the workpiece.

Since the cutting tool is fed continuously or intermittently in the direction of the X axis during cutting operations on the lathe, the diameter of the workpiece where the cutting takes place changes as the cutting progresses. With the spindle rotating at a constant speed, or therefore, the cutting speed deviates from the optimum speed at the beginning of the cutting operation as the cutting advances. To cope with this difficulty, there have been provided means, such as an X-value register, for monitoring the position of the cutting tool along the X axis (or the distance between the axis of the spindle and the cutting tool), and means for computing the speed of rotation for the spindle based on the desired peripheral speed and the content of the X-value register. Each time the cutting tool is moved by a predetermined amount or distance along the X axis, or a pulse is generated to produce movement along the X axis, ±1 is added to the content of the X-value register depending on the direction of movement of the cutting. This enables the X-value register to store information on the current position x of the cutting tool along the X axis. Based on the current position x and the desired peripheral speed V, a computing means carries out the following computation:

$$n = V/2\pi x \quad (2)$$

The spindle is controlled to revolve at the speed n computed from time to time under real time control. According to such a mode of control, the current position x of the cutting tool while it is cutting the workpiece is equal to the radius R of the workpiece at the point of cutting, allowing the spindle to revolve at commanded peripheral speeds at all times in order to maintain the cutting speed substantially constant during the cutting operation.

The content of the X-value register is revised by movement of the cutting tool not only for cutting, but also during rapid advanced such as movement toward a starting point under a rapid-advance command. Thus the X-value register stores information about the current position x of the cutting tool at all times, based on which the rotation of the spindle is controlled. As the distance along the X axis between the point at which the cutting tool starts its rapid advanced and the point at which such rapid advance ends (or cutting starts taking place) is increased, the RPM number of the spindle at the rapid-advance starting point becomes significantly different from the RPM number of the spindle at the cutting starting point (at which point the workpiece is required to revolve at the commanded peripheral speed). The motor which is driving the spindle may not achieve the required RPM even when the cutting tool arrives at the cutting starting point, owing to the short interval of time in which the cutting tool is rapidly advanced to the cutting starting point and to the slow responsiveness of the spindle motor. Accordingly, conventional numerical control apparatuses have required the programming of a dwell command after a rapid-advance command to inhibit the cutting operation until the spindle motor attains the predetermined RPM number after the cutting tool has been positioned. Where the cutting operation is under an external sequential control, a waiting sequence must be inserted in the sequential control. The prior numerical control apparatuses have therefore been disadvantageous in that the program or external sequence is complicated, and the cutting operation is time-consuming due to the waiting or dwell time inserted.

Accordingly, it is an object of the present invention to dispense with the programming of a dwell command or the insertion of a waiting sequence in order to thereby facilitate programming or the like, and to reduce the time required for the cutting operation by eliminating or shortening the waiting time.

SUMMARY OF THE INVENTION

According to the present invention, the RPM number for a spindle is computed from the equation (2) based on a numerical value corresponding to the distance between a cutting point and the axis of the spindle so as to control the spindle to revolve at the computed RPM number before the cutting tool reaches the cutting position under rapid-advance control. When the cutting tool arrives at the cutting starting point, the workpiece revolves at or substantially at the commanded peripheral speed so that the waiting time before the commanded peripheral speed for the workpiece is achieved can be eliminated or reduced, with resulting improved cutting speed. Since the value of the radius of the workpiece at the cutting starting point can be preset in an X-value register by the rapid-advance command, no programming is necessary for the dwelling of the cutting tool and hence the overall programming or external sequential control is simplified.

DESCRIPTION OF THE PREFERRED EMBODIMENTS

The present invention will be described in greater detail with reference to the accompanying drawings.

Figure 1:
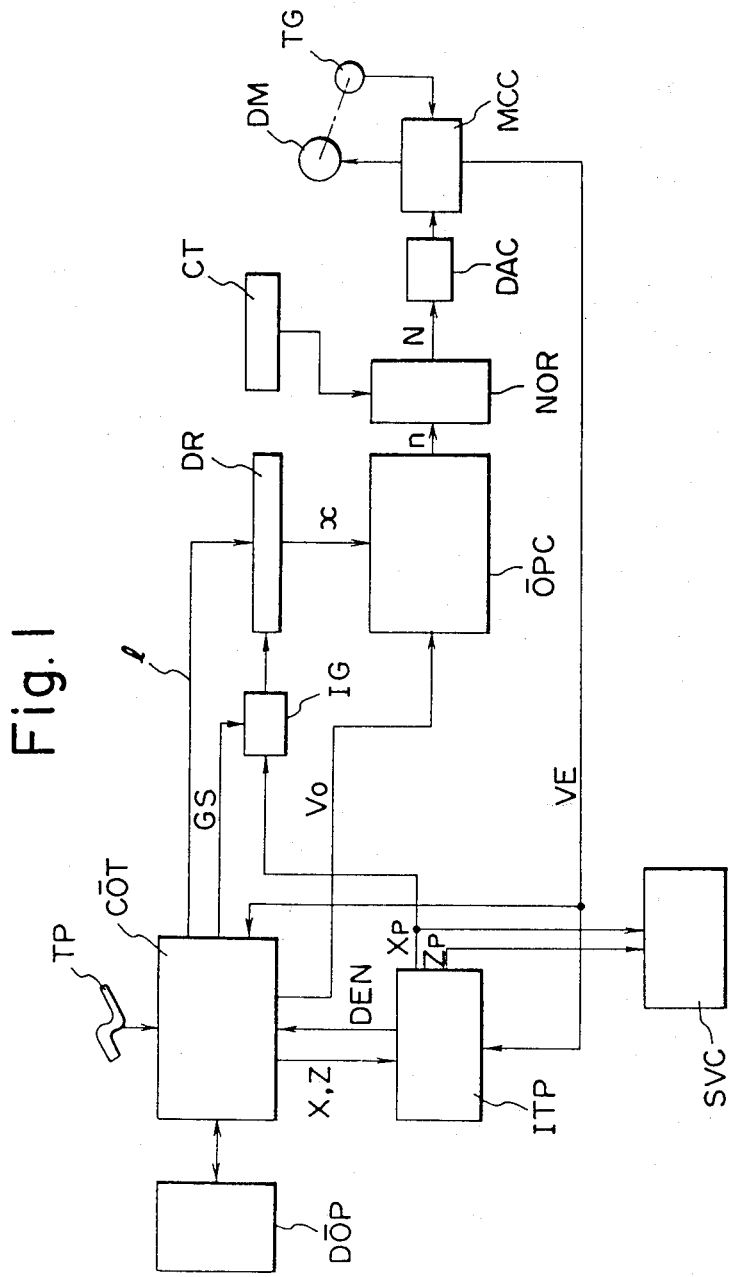
FIG. 1 is a block diagram of an apparatus for carrying out a method of constant peripheral speed control according to the present invention.
Figure 2:
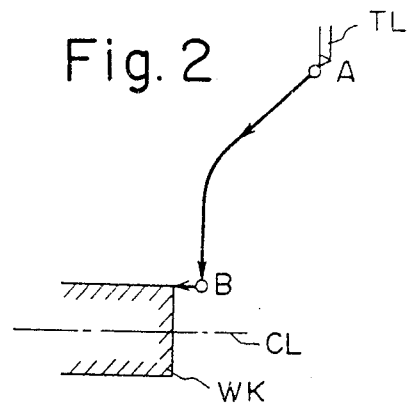
FIGS. 2 through 4 are views illustrative of cutting operations to which the method of the present invention is applicable, FIG. 2 showing the operation in which a cutting tool is rapidly advanced before cutting, FIG. 3 showing the operation in which a cutting tool is rapidly moved parallel to the axis of the spindle (along the Z axis), is changed for another cutting tool, and is rapidly advanced along the X axis, and FIG. 4 showing the operation in which a fixed cycle is repeated.
Figure 3:
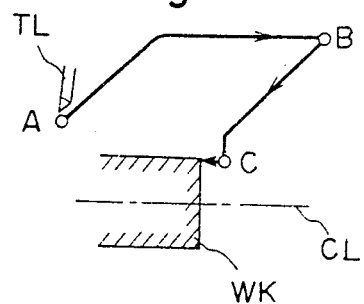
Figure 4:
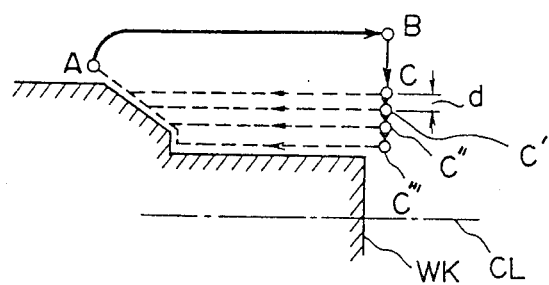

FIG. 1 is a block diagram of an apparatus for carrying out the method of constant peripheral speed control according to the present invention; FIGS. 2 through 4 are views illustrative of cutting operations to which the method of the present invention is applicable, FIG. 2 showing the operation in which a cutting tool is rapidly advanced before cutting, FIG. 3 showing the operation in which a cutting tool is rapidly moved parallel to the axis of the spindle (or along the Z axis), is changed for another cutting tool, and is rapidly advanced along the X axis, and FIG. 4 showing the operation in which a fixed cycle is repeated.

Figure 5:
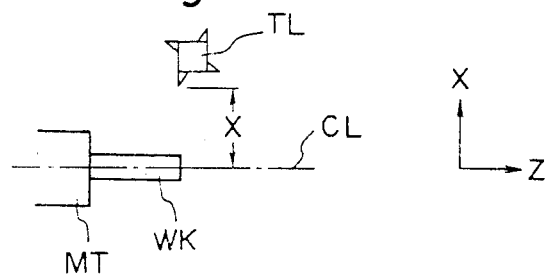
FIG. 5 is a view showing the relationship between the cutting tool and a workpiece.

An X-value register DR comprises an up-down counter which can be preset for storing a number of pulses corresponding to a distance X from an axis CL (axis X) of a spindle to a cutting tool TL as shown in FIG. 5, the content of the register being changed by increments of ±1 depending on the direction of movement of the cutting tool each time a pulse distributor (described later) produces a distributed pulse Xp for moving the cutting tool in the direction of axis X. Designated in FIG. 5 at WK is a workpiece and at MT is a lathe. An operator circuit OPC digitally computes the RPM number n of the spindle from the equation (2) based on a commanded peripheral speed Vo (m/min) of a workpiece and the content x of the X-value register DR. A normalizer circuit NOR normalizes the digital value (the RPM number n of the spindle) produced as a twelve binary bit output from the operator circuit OPC. More specifically, the output n from the operator circuit OPC cannot be used as a command for the RPM number of the spindle since the commanded peripheral speed V is different in units from the content x of the X-value register DR. Therefore, the output n is normalized by the normalizer circuit NOR, which produces a normalized output as a command N for the number of RPM of the spindle. Designated at CT is a correspondence table which stores information about the relationship between n and N, the table storing information about the command N for the number (=2,000) of RPM of the spindle which corresponds to a maximum of n ($2^{12}-1=4,095$). The normalizer circuit effects proportional computation based on such correspondence to normalize the output of the operator circuit OPC. A pulse distributor ITP carries out interpolating computation based on a positional command to supply distributed pulses Xp, Zp to a servo control SVC for moving the cutting tool along the X and Z axes. Designated at TP is a paper tape punched with numerical control information, and at COT is a control circuit for generating a variety of control signals based on information from the paper tape TP, a distribution ending signal DEN from the pulse distributor ITP, a signal from an operating panel, and the like. An operator circuit DOP computes the X value of the next cutting-starting point during a fixed cycle of operation or the like. A gate circuit IG prevents the pulse Xp for controlling movement along the X axis from being applied to the X-value register DR when the cutting tool moves under a rapid-advance command (GOO). Indicated at DAC is a digital/analog converter for converting the command N for the RPM number of the spindle into an analog voltage. Indicated at DM is a motor, at TG is a tachogenerator for producing as an output an analog voltage in response to the actual speed (the RPM number) of the spindle coupled to a motor shaft, and at MCC is a motor control circuit for producing as an output a voltage which is proportional to a difference between the commanded RPM number and the actual RPM number of the spindle in order to eliminate such a difference.

Constant peripheral speed control will now be described making reference to FIG. 2.

The cutting tool TL is advanced under a rapid-advance command from a point A to a point B. After the positioning of the cutting tool has been completed, the cutting operation is started by a cutting command. Designated at WK is a workpiece.

Figure 6:
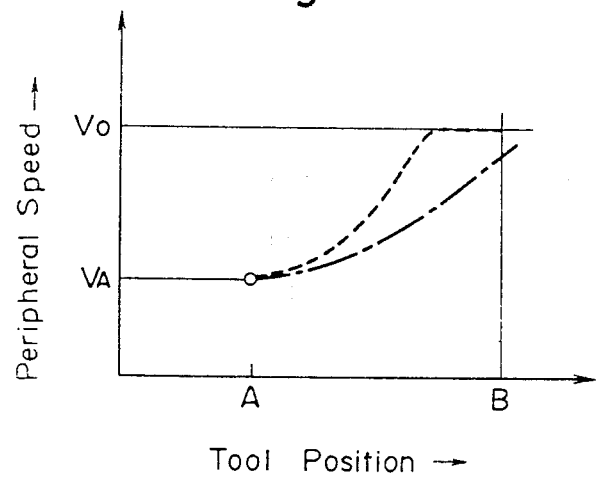
FIG. 6 is a graph showing the relationship between the position of a cutting tool and the peripheral speed of the workpiece.

The control circuit COT, when supplied with a rapid-advance command (GOO) from the paper tape TP, produces a gate control signal GS to close the gate circuit IG and at the same time presets the X value of the point B, which is read subsequent to the rapid-advance command (GOO), into the X-value register DR. Where the positional command is incremental, the control circuit COT causes the operator circuit DOP to compute the X value of the point B using the current position of the cutting tool (memorized in a non-illustrated memory) and using the incremental value, the result of this computation being preset into the X-value register DR. The operator circuit OPC computes the RPM number n for the spindle from the equation (2) based on the commanded peripheral speed Vo supplied as an input from the control circuit COT and the content of the X-value register DR. The RPM number n for the spindle is normalized by the normalizer circuit NOR into the command N for the actual RPM number of the spindle, which is supplied via the digital/analog converter DAC to the servo control circuit MCC. The servo control circuit MCC, when supplied as an input with the command N for the number of RPM of the spindle, starts the servo control to bring the actual number of RPM of the spindle into conformity with the command N for the number of RPM of the spindle. Concurrent with the foregoing control of the RPM number of the spindle, the pulses Xp, Zp are distributed from the pulse distributor ITP based on the positional commands X, Z, and are supplied as inputs to the servo control SVC to move the cutting tool to the point B at a speed for rapid advance. Stated otherwise, operation of constant peripheral speed control based on the diameter of the workpiece at the point B is started simultaneously with the starting of positioning of the cutting tool by way of rapid advance. When the positioning of the cutting tool is finished, the peripheral speed of the workpiece is in conformity with or approximates the command peripheral speed Vo. FIG. 6 shows the relationship between the position of the cutting tool and the peripheral speed thereof, the horizontal axis representing the position of the cutting tool and the vertical axis the actual peripheral speed thereof. Indicated at A and B are a rapid-advance starting point and a rapid-advance ending point (or a cutting starting point), respectively, which correspond to the points A and B, respectively, in FIG. 2. Indicated at $V_A$ is a peripheral speed at the point A, and at Vo is a commanded peripheral speed.

Where the servo system for the spindle motor has rapid responsiveness, or the distance between the points A and B is long, the commanded peripheral speed Vo is reached before the cutting tool reaches the point B. Conversely, where the responsiveness of the servo system for the spindle motor is slow, or the distance between the points A and B is short, the peripheral speed of the workpiece is below but approaches the commanded peripheral speed Vo when the cutting tool arrives at the point B.

Upon completion of positioning of the cutting tool under the rapid-advance command, the content of the X-value register DR corresponds to the X value of the current position of the cutting tool, storing information on the workpiece diameter from that time on, and the distribution ending signal DEN is supplied from the distributor ITP as an input to the control circuit COT. The control circuit COT now drives a non-illustrated tape reader to read the next block of information or the cutting command and applies positional information X, Z to the pulse distributor ITP. At this time, if the actual RPM number of the spindle is in conformity with the commanded number N of RPM for the spindle, that is, the peripheral speed of the workpiece is in conformity with the commanded peripheral speed (as shown by the dotted line in FIG. 6), a signal VE indicative of speed agreement is sent as an output from the servo control MCC, whereupon the pulse distributor ITP effects the pulse distributing computation for the cutting operation, producing distributed pulses Xp, Zp which are applied to the servo system for driving the cutting tool to thereby start the cutting operation. With the signal VE being applied to the control circuit COT, the latter produces a gate control signal GS which is "0", thereby opening the gate circuit IG. When the distributed pulse Xp is generated, the content of the X-value register DR is changed by an increment of +1 or −1 depending on the direction of movement of the cutting tool. Thus, the X-value register stores the value of the workpiece diameter at all times.

If on the other hand the actual RPM number of the spindle is out of agreement with the commanded number N, that is, if the workpiece does not revolve at the commanded peripheral speed (as shown by the dot-and-dash line in FIG. 6), no speed-agreement signal VE is produced. Therefore, the pulse distributing computation based on the cutting command inhibits the pulse distributor ITP until the signal VE is generated. The interval of time for such inhibition is, however, short, since the actual peripheral speed of the workpiece continues to approach the commanded peripheral speed Vo. Upon agreement between the actual peripheral speed of the workpiece and the commanded peripheral speed Vo, the signal VE is supplied to both the pulse distributor ITP and the control circuit COT. The control circuit COT, when supplied with the signal VE, produces a "0" gate control signal GS to open the gate circuit IG. Thus, the distributed pulse Xp is applied via the gate circuit IG to the X-value register DR, whereupon the same operation as is conventional is performed until the rapid-advance command (G00) is generated. More specifically, when the pulse Xp for controlling movement the direction of axis X is generated based on a command (a cutting command, for example) other than the rapid-advance command, the content of the X-value register DR is revised by an increment of ±1 depending on the direction of movement of the cutting tool, that is, the X-value register stores information about the radius of the workpiece at all times. Based on the radius and the commanded peripheral speed Vo, the operator circuit OPC and the like compute the command N for the RPM number of the spindle, which is supplied as an output. The servo control circuit MCC effects servo control in order to bring the actual RPM number of the spindle into conformity with the commanded number N for equalizing the peripheral speed of the workpiece with the commanded peripheral speed.

FIG. 3 shows an operation to which the present invention is applied. In FIG. 3 the cutting tool is rapidly moved from the point A to the point B, wherein the cutting tool is changed for another cutting tool, which is then rapidly advanced to a point C for the starting cutting operation. In such an operation, it would be possible to set the X value of the point C in the X-value register DR based on the rapid-advance command at the point B, as in the method of constant peripheral speed control in the machining operation of FIG. 2. However, the peripheral speed of the workpiece might be out of conformity with the commanded peripheral speed Vo as indicated by the dot-and-dash line in FIG. 6 upon completion of positioning of the cutting tool in the point C, since the responsiveness of the servo system for the spindle motor may not be fast, and the distance between the points B and C may be short. To avoid this situation, the X value of the point C, which is a cutting starting point or the diameter R of the workpiece, is set in the X-value register DR at the point A simultaneously with or prior to issuance of the rapid-movement command at the point A. With this arrangement, the peripheral speed of the workpiece is brought into conformity with the commanded peripheral signal Vo upon completion of the positioning of the cutting tool at the point C in almost all cases.

This procedure can be performed simply by changing a rapid-movement command G00 Z—* at the point A to G00 Z—R—*, where G00 is a rapid-movement command, Z— is a positional command along the Z axis, R— is a diametrical-value setting command, and * is a block end.

Operation of the circuit is substantially the same as in the control in the cutting operation shown in FIG. 2, except that the control circuit COT causes the value of a radius (a numerical value after R) to be set in the X-value register DR via a line 1 at the time of reading R—.

Such a process of designating R through programming is not limited to the operation shown in FIG. 3, but allows the value of a radius to be set in the X-value register at any desired time by inserting an order for setting R at an appropriate stage.

FIG. 4 illustrates another application in which the present invention is embodied and in which a fixed cycle of operation is repeated. Here the cutting starting point is shifted by increments of d and the cutting movement and positioning of the cutting tool at the cutting starting point upon completion of the cutting are repeated. The fixed cycle of operation shown in FIG. 4 comprises a cutting movement from a cutting starting point C, rapid movement along the Z axis from the point A to the point B after the cutting, and rapid advance along the X axis up to a next cutting starting point C′ for cutting movement from the point C′ upon completion of the rapid advance. The amount of cutting is added by increments of d by repeating the foregoing cycle of operation until the workpiece is cut to a desired shape.

In such a cutting operation, the command for rapid movement of the cutting tool along the Z axis given at the point A upon completion of cutting causes the X value of a next cutting starting point (point C′) or the workpiece diameter to be set in the X-value register DR, so that the workpiece can revolve at the commanded peripheral speed Vo while the cutting tool is moving from the point A via the point B to the point C′.

More specifically, a fixed cycle mode of operation is given by the tape, and when the rapid-advance command G00 comes out, the main control circuit COT computes the X-value $x_o'$ of the point C′ or the radius of the workpiece at the point of cutting, the result of this computation being set in the X-value register DR. The amount of cutting d and X-value $X_o$ of the first cutting starting point C are stored in advanced in a memory (not shown) in the main control circuit COT. When the command G00 is given, the operator circuit DOP carries out the computation:

$$x_o - d \rightarrow x_o'$$

Hence, the $x_o'$ constitutes the X-value of the point C′.

The cutting tool reaches the point C′ in accordance with the same circuit operation as in the constant peripheral speed control for the cutting operation illustrated in FIG. 2, whereupon the actual peripheral speed of the workpiece is the same as or in the vicinity of the commanded peripheral speed. Upon conformity of the actual peripheral speed with the commanded peripheral speed, the pulse distributor ITP effects pulse distributing computation for the cutting operation.

While in the foregoing description the X-value register is caused to store the X-value of a cutting starting point or the radius of a workpiece, the X-value register may also store a diametrical value or corresponding numerical value. While in the foregoing description hardware or circuits are provided respectively for separate functions, a microprocessor or similar devices may be utilized for carrying out the method of the present invention by way of software.

Although the actual speed of the spindle has been described as being detected by a tachogenerator coupled thereto, the spindle speed may be known from the frequency of positional pulses generated by a position coder, which are ordinarily mounted on lathes.

As described above, a method of constant peripheral speed control according to the present invention can be used to advantage for controlling rotation of spindles in cutting operation by lathes or other machine tools.

What is claimed is:

1. An improved method of constant peripheral speed control for a workpiece supported on a spindle, of the type wherein a distance value corresponding to the distance between the spindle axis and a tool for cutting the workpiece is stored in a memory means, the stored content is revised in response to movement of the tool, and a signal for rotating the spindle at an RPM which imparts a constant peripheral speed to the workpiece is determined based on a commanded peripheral speed and the content stored in the memory means, wherein the improvement comprises: inhibiting the revision of said stored content when the tool is moved on the basis of a rapid-advance command; storing in said memory means a numerical value corresponding to the distance between a position at which the tool starts moving at a speed other than the rapid-advance speed and the axis of the spindle; determining the RPM for the spindle based on said numerical value and the commanded peripheral speed, and driving the spindle to rotate it at said RPM before the tool reaches said position.

2. The method according to claim 1, wherein the step of storing in said memory means a numerical value corresponding to the distance between a position at which the tool starts moving at a speed other than the rapid-advance speed and the axis of the spindle comprises the step of storing, at the time of starting the rapid advance, a numerical value corresponding to the distance between a position at which the rapid advance ends and the axis of the spindle.

3. The method according to claim 1, further comprising the step of moving the tool in fixed cycles of operation whereby a cutting starting position is shifted by predetermined increments, the cutting movement of the tool and positioning movement thereof to the next cutting starting position after the cutting has ended being repeated, and wherein the step of storing in said memory means a numerical value corresponding to the distance between a position at which the tool starts moving at a speed other than the rapid-advance speed and the axis of the spindle comprises the step of storing, upon completion of the cutting, a numerical value corresponding to the distance between the next cutting starting position and the axis of the spindle.

4. The method according to claim 3, wherein the step of storing, upon completion of the cutting, a numerical value corresponding to the distance between the next cutting starting position and the axis of the spindle comprises the step of storing a numerical value which is given by the cutting starting position and said predetermined increment and corresponds to the distance between the next cutting starting position and the axis of the spindle.

5. The method according to claim 1, wherein the step of storing in said memory means a numerical value corresponding to the distance between a position at which the tool starts moving at a speed other than the rapid-advance speed and the axis of the spindle comprises the step of storing the numerical value in said memory means before more than one rapid-advance command steps are taken when there are a plurality of rapid-advance command steps before starting the cutting operation.

6. The method acccording to claim 1, 2, 3 or 5, wherein the step of driving the spindle to rotate it at said RPM before the tool reaches said position comprises the steps of comparing the actual RPM of the spindle with the commanded RPM therefor, and beginning the cutting operation upon confirming that the difference between the actual RPM and the commanded RPM for the spindle is within a given range after the cutting tool has been positioned in place under the rapid-advance command.

* * * * *

UNITED STATES PATENT AND TRADEMARK OFFICE
CERTIFICATE OF CORRECTION

PATENT NO. : 4,415,977

DATED : November 15, 1983

INVENTOR(S) : Fukuyama et al

It is certified that error appears in the above-identified patent and that said Letters Patent is hereby corrected as shown below:

Front page, [56], after "Primary Examiner - Edward J. Wise", insert --Attorney, Agent, or Firm - Staas & Halsey--.

Col. 1, line 17, "a" should be --the--.
line 43, delete "or".

Col. 3, line 10, "FIG. 3 showing..." should not begin a new paragraph;
line 14, "FIG. 4 showing..." should not begin a new paragraph.

Col. 7, line 4, "d" should be --$\underline{d}$--;
line 14, "d" should be --$\underline{d}$--;
line 30, "d" should be --$\overline{\underline{d}}$--.

Signed and Sealed this

Twenty-eighth Day of February 1984

[SEAL]

Attest:

GERALD J. MOSSINGHOFF

Attesting Officer

Commissioner of Patents and Trademarks